US012656737B2

(12) United States Patent
Wiederrecht et al.

(10) Patent No.: US 12,656,737 B2
(45) Date of Patent: Jun. 16, 2026

(54) LUNISOLAR CALENDAR DISPLAY MECHANISM FOR A CLOCKWORK MOVEMENT, CORRESPONDING CLOCKWORK MOVEMENT AND CORRESPONDING TIMEPIECE

(71) Applicant: NOGERAH SA, Meyrin (CH)

(72) Inventors: Jean-Marc Wiederrecht, Bernex (CH); Maximilien Di Blasi, St-Genis Pouilly (FR); Guy Dubois-Ferrière, St-Cergues (FR); Laurent Wiederrecht, Onex (CH); Guillaume Lewis, Geneva (CH)

(73) Assignee: NOGERAH SA, Meyrin (CH)

(*) Notice: Subject to any disclaimer, the term of this patent is extended or adjusted under 35 U.S.C. 154(b) by 309 days.

(21) Appl. No.: 18/688,248

(22) PCT Filed: Aug. 16, 2022

(86) PCT No.: PCT/EP2022/072873
§ 371 (c)(1),
(2) Date: Feb. 29, 2024

(87) PCT Pub. No.: WO2023/030876
PCT Pub. Date: Mar. 9, 2023

(65) Prior Publication Data

US 2024/0377789 A1 Nov. 14, 2024

(30) Foreign Application Priority Data

Aug. 30, 2021 (EP) .................................... 21193849

(51) Int. Cl.
*G04B 19/24* (2006.01)
*G04B 19/253* (2006.01)

(52) U.S. Cl.
CPC ....... *G04B 19/241* (2013.01); *G04B 19/2536* (2013.01)

(58) Field of Classification Search
CPC .. G04B 19/24; G04B 19/241; G04B 19/2536; G04B 19/082
See application file for complete search history.

(56) References Cited

U.S. PATENT DOCUMENTS 5,379,272 A 1/1995 Parmigiani
8,811,125 B2 * 8/2014 Schmidt ............ G04B 19/2536 368/37

(Continued)

FOREIGN PATENT DOCUMENTS

CH 711072 A2 11/2016
CN 100412726 C 8/2008

(Continued)

OTHER PUBLICATIONS

International Search Report for PCT/EP2022/072873 dated Nov. 9, 2022, 5 pages.

(Continued)

*Primary Examiner* — Sean Kayes
(74) *Attorney, Agent, or Firm* — NIXON & VANDERHYE

(57) ABSTRACT

This relates to a calendar display mechanism for a clockwork movement, including a day-of-the-month wheel intended to actuate a month wheel at the end of each month, the month wheel including a year cam that has n series of graduations, each of which is associated with a particular year, each series of graduations having a number m of graduations corresponding to the number of months in the associated year, the display mechanism including a rotatable month lever which supports a month feeler-spindle thereon which remains in contact with the year cam so as to define the angular orientation of the month lever, the lever also having a kinematic connection to a month display wheel so as to cause the wheel to perform a retrograde movement.

22 Claims, 8 Drawing Sheets

(56) References Cited

U.S. PATENT DOCUMENTS

| | | | | |
|---|---|---|---|---|
| 8,848,489 | B2 * | 9/2014 | Suzuki | G04B 19/2536 368/37 |
| 9,448,534 | B2 * | 9/2016 | Goeller | G04B 19/2538 |
| 2006/0221772 | A1 | 10/2006 | Vuilleumier et al. | |
| 2007/0002690 | A1 | 1/2007 | Rochat | |
| 2009/0274010 | A1 | 11/2009 | Vuilleumier et al. | |
| 2012/0213037 | A1 * | 8/2012 | Schmidt | G04B 19/2536 368/37 |
| 2013/0170325 | A1 * | 7/2013 | Suzuki | G04B 19/2536 368/37 |
| 2016/0103421 | A1 * | 4/2016 | Goeller | G04B 19/2536 368/28 |
| 2017/0277126 | A1 | 9/2017 | Bernard et al. | |
| 2019/0179266 | A1 | 6/2019 | Kissling et al. | |

FOREIGN PATENT DOCUMENTS

| | | | |
|---|---|---|---|
| CN | 106909055 | A | 6/2017 |
| CN | 106980255 | A | 7/2017 |
| CN | 109656119 | A | 4/2019 |
| DE | 102008040353 | A1 | 1/2009 |
| EP | 3026504 | B1 | 9/2017 |
| JP | 2011128027 | A | 6/2011 |
| WO | 2007129933 | A1 | 11/2007 |
| WO | 2015062839 | A2 | 5/2015 |

OTHER PUBLICATIONS

Written Opinion of the ISA for PCT/EP2022/072873 dated Nov. 9, 2022, 6 pages.

* cited by examiner

LUNISOLAR CALENDAR DISPLAY MECHANISM FOR A CLOCKWORK MOVEMENT, CORRESPONDING CLOCKWORK MOVEMENT AND CORRESPONDING TIMEPIECE

CROSS-REFERENCE TO RELATED APPLICATIONS

This application is the US national stage of PCT/EP2022/072873, filed Aug. 16, 2022 and designating the United States, which claims the priority of EP 21193849.3, filed Aug. 30, 2021. The entire contents of each foregoing application are incorporated herein by reference.

TECHNICAL FIELD

The present invention concerns a calendar display mechanism for a timepiece movement, including

- a day of the month mobile intended to control the movement of a day of the month display member and to be able to complete a full turn on itself in a maximum number p of days during long months,
- a mechanism for actuation of said day of the month mobile arranged to cause the latter to turn by at least one step each day,
- a month mobile arranged to be actuated by said day of the month mobile on each full turn of the latter,
- a correction device for short months including a month cam carried by said month mobile and including a plurality of peripheral sectors each of which is associated with a given month in a cycle of n years, n being greater than one, the mean radius of each of said peripheral sectors being a function of the length of the associated month, said mechanism for actuation of said day of the month mobile being arranged to interact with said month cam and to allow actuation of said day of the month mobile by at least one additional step at the end of each short month comprising a number of days less than p.

PRIOR ART

Display mechanisms of the above kind have long been well known in the art, above all in connection with the Gregorian calendar, which is a solar calendar.

Thus, for example, Gregorian day of the month display mechanisms known as annual mechanisms are known in which a distinction is made between long months, of thirty-one days and short months, of thirty days or fewer. A memory device manages the regular alternation between short months and long months and causes a day of the month indicator to go from the thirtieth of a short month directly to the first of the next month. The month of February necessitates manual correction on the change from the twenty-eighth or twenty-ninth to March first.

Also known are Gregorian calendar display mechanisms known as perpetual mechanisms, in which not only is the month of February taken into account but also bissextile years. Mechanisms of this kind can theoretically function for close to one hundred years without necessitating manual correction, i.e. until a bissextile years has to be eliminated.

The patent EP 3026504 B1 describes an example of a perpetual Gregorian calendar display mechanism. A standard approach in this type of mechanism, as depicted in the above patent, consists in using a month mobile including a "48 cam", i.e. a cam having forty-eight peripheral sectors each of which is associated with a given month in a "bissextile" cycle of four years and the mean radius of which is a function of the length of corresponding month. A day of the month lever actuating a day of the month display mobile once a day cooperates with the 48 cam to cause the day of the month display mobile to advance by at least one additional step at the end of months comprising fewer than thirty-one days. The day of the month display mobile includes one tooth longer than the others and intended to cooperate with teeth of the month mobile to cause it to advance by one step on each complete turn of the day of the month display mobile and therefore to position a new peripheral sector corresponding to the next month facing the day of the month lever. Moreover, the teeth of the month mobile also cooperate with a month display mobile carrying a month display hand to cause it to execute a complete turn on itself once a year.

These prior art mechanisms are generally unsuitable for displaying lunisolar calendars such as Jewish, Chinese, Japanese, Vietnamese or Korean calendars, given that the latter include numbers of months and of days of the month variable as a function of the year. Also, the approach consisting in employing a memory device as in Gregorian calendar display mechanisms seems not to be appropriate for displaying lunisolar calendars.

Various solutions have already been proposed, in particular for displaying Islamic or Chinese calendars, in an attempt to approximate as closely as possible the "perpetual" concept as defined in connection with Gregorian calendars.

In particular, it will be noted that the Chinese calendar, which is of lunisolar type, has no periodicity and is consequently impossible to display in a truly perpetual manner by means of a timepiece mechanism. In fact, although the (lunar) months of the Chinese calendar include twenty-nine or thirty days, the corresponding alternation does not obey any precise rule and years comprise a variable number of months, an intercalary (or embolismic) month being intercalated between two months of certain years, without this necessarily being at the same time of the year, to maintain the compatibility of the Chinese calendar with the solar year. Furthermore, the Chinese calendar incorporates diverse additional information with different periodicities. In particular, a first of these kinds of information is the celestial stem, of which there are ten, the celestial stems succeeding one another every year, therefore defining a period of ten years. Another of these kinds of information is the terrestrial branch (better known as signs of the Chinese zodiac), of which there are twelve and which succeed one another with an annual rhythm, thus defining a period of twelve years. Thus the complete renewal of these kinds of information is effected during a sexagesimal cycle, that is to say over a period of sixty (Chinese) years.

Some mechanisms for displaying the Chinese calendar have been proposed that have a highly complex construction, making it possible to limit the frequency of human intervention to maintain a correct display over time, whereas constructions of intermediate complexity lead to the information displayed drifting compared to the exact calendar.

Another approach counter to these complex constructions is described in the patent EP 1739508 B1. The mechanism for displaying the Chinese calendar (the display of which is simplified) disclosed in the above patent is therefore of limited complexity but at the cost of a high frequency of intervention by a user to enter manually the duration of a month and the presence or absence of an intercalary month. Consequently, the user of this mechanism must every month consult a table indicating the data of the Chinese calendar to adjust their mechanism in an appropriate manner.

DISCLOSURE OF THE INVENTION

A main object of the present invention is to propose a mechanism for displaying a calendar of alternative construction to those of known display mechanisms, in particular where driving the month display mobile is concerned.

Another object of the invention is to benefit from this alternative construction to produce a calendar display mechanism in which the number of months can vary from one year to another, as is the case in particular of calendars of Chinese or Hebrew type.

To this end the present invention more particularly concerns a calendar display mechanism of the kind indicated above, characterized

- by the fact that the month mobile carries a year cam indexed on the month cam and including n series of steps each of which is associated with a given year, each series of steps comprising a number m of steps corresponding to the number of months in the associated year, and
- by the fact that the display mechanism includes a rotary month lever carrying a month feeler-spindle held in contact with the year cam to define the angular orientation of the rotary month lever, the latter also having a kinematic connection with a month display mobile to drive it according to a retrograde movement.

Thanks to these features the manufacturer in particular has greater flexibility in installing the month display mobile than with earlier constructions; the latter can for example be located away from the month mobile.

In accordance with a preferred embodiment,

- the month lever and the month display mobile may be shaped and kinematically connected to one another in such a manner that the latter pivots from an initial orientation to a final orientation, separated from one another by an angle comprised between 40 and 360 degrees, to display the months throughout a given year, and
- the display mechanism may include an elastic return member arranged to act on the month lever to hold the month feeler-spindle against the year cam, and to move the month display mobile from its final orientation to its initial orientation at year end.

It is therefore possible without impacting the construction to opt for a month display over a complete turn or over a sector.

In accordance with a preferred variant embodiment, the day of the month mobile may include a day of the month cam in the shape of a spiral, the display mechanism including a day of the month display lever having a day of the month feeler-spindle, arranged to cooperate with the day of the month cam, and a kinematic connection to a day of the month display mobile intended to carry the day of the month display member.

As mentioned above, the features that have just been described can generally be employed to obtain a calendar display mechanism in which the years comprise a variable number of months from one year to another. Also, in accordance with a preferred embodiment at least one of the n series of steps of the year cam comprises a number m of steps different from twelve.

In this case, when at least one of the n years includes at least one intercalary month in addition to the twelve basic months, in the corresponding series of steps, at least two steps may have a reduced height compared to that of the other steps. The steps respectively associated with the month preceding the intercalary month, the intercalary month and the month following the intercalary month each have a reduced height compared to the height of the other steps of the corresponding series of steps. In this case, to implement a timepiece including a display mechanism of this kind the timepiece may advantageously include a month display member arranged to move in front of month graduations having three possible indicator positions located in a display sector of predefined length for each month, a central position to display a month with which no intercalary month is associated and two additional positions on respective opposite sides of the central position respectively to display a month with which an intercalary month is associated and the corresponding intercalary month.

The month mobile may generally include a shaft intended to carry a member for displaying information relating to the current year in association with at least one fixed indication.

Alternatively or additionally, the month lever may include a beak arranged to cooperate with a year driving mobile to cause it to pivot by one step at year end when the month feeler-spindle moves from one series of steps to the next, the year driving mobile being intended to drive at least one member for displaying information relating to the current year in association with at least one fixed marker.

In this case and when at least one of the n series of steps of the year cam comprises a number m of steps other than twelve to display a Chinese calendar, the year driving mobile may include a terrestrial branch cam in the shape of a spiral and having twelve sections over a complete turn, the display mechanism including a terrestrial branch lever having a terrestrial branch feeler-spindle arranged to cooperate with the terrestrial branch cam and kinematically connected to a terrestrial branch display mobile intended to control the movement of a terrestrial branch display member.

Alternatively or additionally, when at least one of the n series of steps of the year cam comprises a number m of steps other than twelve to display a Chinese calendar, the year driving mobile may include a celestial stem cam in the shape of a spiral and having twelve sections over a complete turn (in the form of ten different sections—for a ten year cycle—two of which are duplicated to constitute two additional sections for the two first years of the next ten year cycle), the display mechanism including a celestial stem lever having a celestial stem feeler-spindle and arranged to cooperate with the celestial stem cam and kinematically connected to a celestial stem display mobile intended to control the movements of a celestial stem display member.

Generally speaking, when the display mechanism is intended to display a lunar or lunisolar calendar in which the months comprise twenty-nine or thirty days,

- the mechanism for actuation of the day of the month mobile may include a day of the month lever intended to be actuated once a day to pivot from a rest position to an actuation position in which it acts via an actuation beak that it carries on a thirty wheel of the day of the month mobile, to cause the latter to advance by at least one step,
- the day of the month lever may include a day of the month feeler-spindle arranged to cooperate with the month cam to define its rest position among two possible rest positions as a function of the length of the current month,
- the thirty wheel may have twenty-nine teeth of substantially the same length and a thirtieth tooth longer than the others and intended to be positioned in reach of the actuation beak on the thirtieth day of months comprising thirty days, and the month cam, the day of the month lever and the thirty wheel may be shaped and positioned relative to one another in such a manner that the actuation beak is able to act on the thirtieth tooth as soon as the twenty-ninth day of months comprising twenty-nine days to cause the day of the month mobile to advance by two steps when the day of the month lever goes from its rest position to its actuation position.

In this case, the display mechanism may include a mobile for displaying the length of the month, intended to control the position of a member for displaying the length of the month and cooperating with the day of the month lever in such a manner as to be able to occupy two different positions as a function of the length of the current month.

Generally speaking, the display mechanism may include a twenty-four hour wheel having a kinematic connection with an annual display mobile intended to control the movement of an annual display member in such a manner that the latter performs a complete turn on itself in one year.

Furthermore, the present invention concerns a timepiece movement including a display mechanism having some or all of the features that have just been described and a timepiece including a display mechanism of that kind.

BRIEF DESCRIPTION OF THE DRAWINGS

Other features and advantages of the present invention will become more clearly apparent on reading the following detailed description of embodiments given with reference to the appended drawings provided by way of non-limiting example and in which.

EMBODIMENT(S) OF THE INVENTION

Figure 1:
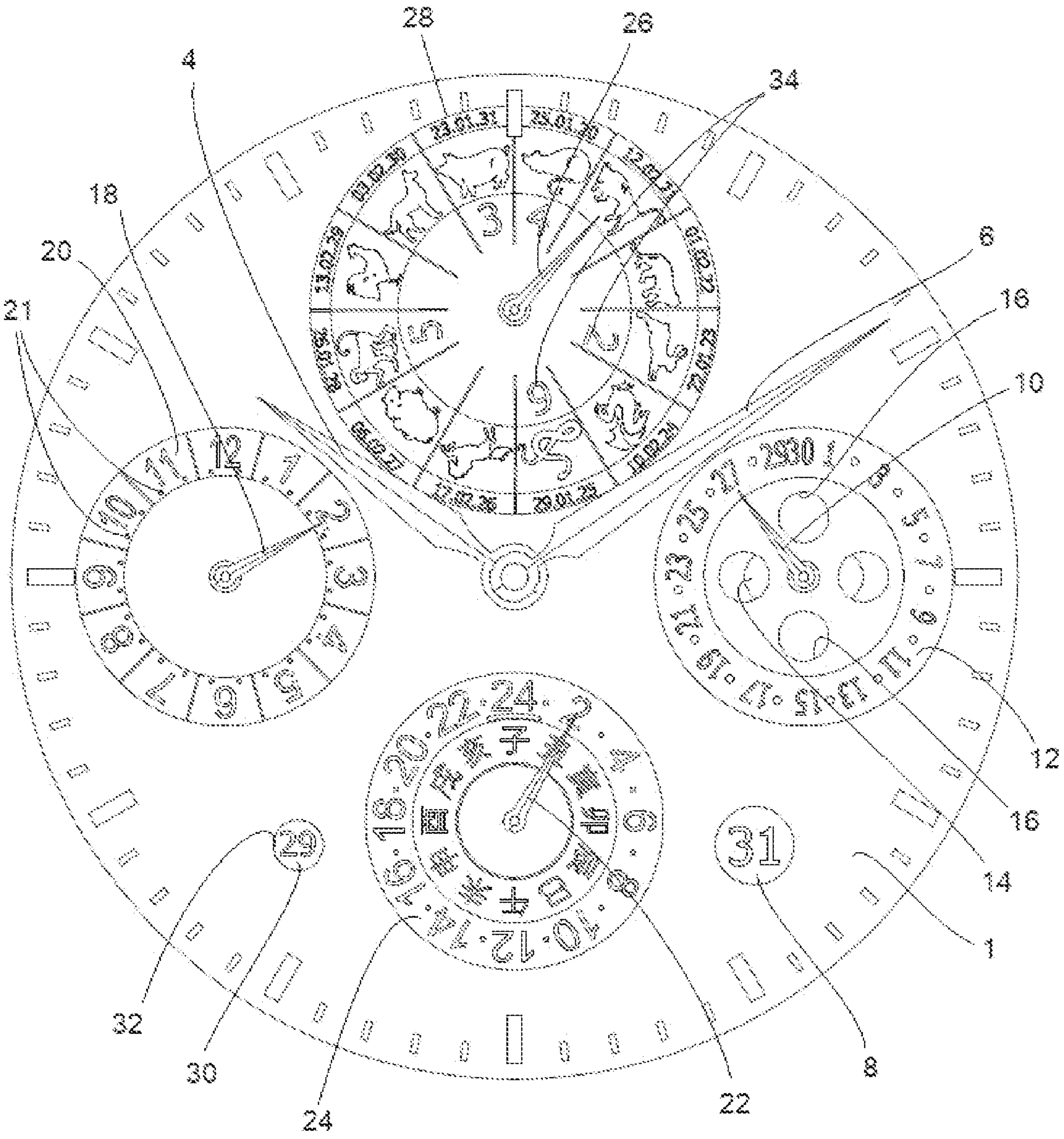
FIG. 1 represents a simplified front view of a timepiece dial depicting the use of a display mechanism in accordance with a first preferred embodiment of the present invention.

FIG. 1 represents a simplified front view of a dial 1 for a timepiece depicting a display mechanism (reference number 2 in FIG. 2) in accordance with a first preferred embodiment of the present invention.

Without departing from the scope of the invention the display mechanism 2 may be a mechanism integrated into an appropriate timepiece caliber or added to a pre-existing timepiece base caliber.

By way of non-limiting illustrative example, the dial 1 and the corresponding display mechanism 2 are intended to be used in a wristwatch to display information relating to the Chinese calendar, which is a lunisolar type calendar. To be more precise, the display mechanism 2 is intended to enable the display of this information over cycles of twelve years without it being necessary for the user to make even the slightest correction throughout the duration of a cycle, as will emerge more clearly in the remainder of the description.

Of course, the present invention is not limited to the duration of the cycle referred to by way of example—cycles of four or six years could be used without substantially impacting the implementation of the invention—or to use in a wristwatch, since other types of timepiece could be produced on the basis of the present teaching. For example, the increased volume available for the timepiece movement of a clock can enable the production of a mechanism for displaying the Chinese calendar over sixty years without it being necessary for the user to make even the slightest correction throughout the duration of the cycle.

Without going into all the details of the Chinese calendar, it must be remembered that the months of the Chinese calendar comprise twenty-nine or thirty days and that some years include an intercalary month in addition to the basic twelve months, the occurrence of these intercalary months also varying from one year to another, making it impossible to use a perpetual mechanism in the sense known in connection with the Gregorian calendar.

The display mechanism 2 associated with the dial 1 can generally be associated with a timepiece movement (not depicted) intended to control the movement of the current time hands 4, 6, which here are central by way of non-limiting illustration, as well as that of hand 8 of the Gregorian day of the month, whether the latter be single, annual, perpetual or secular.

In accordance with a first embodiment of the display mechanism 2 associated with the dial 1 the latter may be intended to display basic information of the Chinese calendar, in particular:

the Chinese (lunar) day of the month by means of a day of the month hand 10 moving in front of appropriate day of the month graduations 12, the phases of the moon by means of a moon disc 14 moving under one or more appropriate windows or apertures 16, the Chinese month by means of a month hand 18 moving over appropriate month graduations 20, the hour over twenty-four hours by means of a twenty-four hour hand 22 moving over twenty-four hour graduations 24, as well as the Chinese double hours by means of the same twenty-four hour hand 22, by way of its simultaneous cooperation with a scale indicating the twelve Chinese hours, for each Chinese year, over a cycle of twelve years, the date of the Chinese New Year in accordance with the Gregorian calendar, the number of the intercalary month, if there is one, and the sign of the Chinese zodiac, by means of a year hand 26 moving in a year counter 28, and the length of the Chinese month, twenty-nine or thirty days, by means of a display member 30 for displaying the length of the month, partly visible through an aperture 32 of the dial 1.

By way of non-limiting illustrative example, here the display of the day of the month uses circular day of the month graduations 12 extending over 360 degrees.

The year counter 28 is divided into twelve sectors each of which corresponds to a Chinese year and can carry additional information. For example, here the year counter 28 carries at its periphery a display of the Chinese New Year for each of the years of the corresponding cycle of twelve years. Furthermore, here the year counter 28 includes an indication of the intercalary month 34 when the year includes one. Thus, the Chinese year commencing 22 Jan. 2023 contains an intercalary month after the second month of the year. The year counter 28 may also be used to indicate the terrestrial branches or signs of the Chinese zodiac by a depiction of the corresponding animal in each sector, for example.

Finally, here the month graduations 20 feature twelve successive sectors each of which is associated with a given month number and carries a corresponding indication intended to be designated by the month hand 18. Furthermore, each sector also contains two dots 21 intended to enable indication of a given month and then of the corresponding intercalary month when there is one by appropriate positioning of the month hand 18 before and then after the corresponding indication.

Of course, alternative arrangements of the month graduations are possible without departing from the scope of the invention as defined by the claims. By way of non-limiting example the month graduations 20 may instead feature twelve indications corresponding to the twelve basic months of the year, separated from one another by a dot enabling intermediate positioning of the month hand 18 between successive indications to display an intercalary month when there is one.

The display mechanism 2 enabling control of the movement of these various display members is described next with reference to FIG. 2.

The display mechanism 2 includes a twenty-four hour wheel 40 driven in rotation by an hour wheel 42 via an intermediate wheel 44 to turn once on itself every twenty-four hours.

The twenty-four hour wheel 40 drives a twenty-four hour mobile 46 via another intermediate wheel 48 so that the twenty-four hour mobile 46 and therefore the twenty-four hour hand 22 that it carries execute a complete turn in twenty-four hours.

The display mechanism 2 includes a day of the month mobile 50, here carrying the day of the month display hand 10 directly, and an appropriate actuation mechanism. That actuation mechanism includes in particular an actuation finger 52 carried by the twenty-four hour wheel 40 and arranged to act once each day on a day of the month lever 54 itself arranged to pivot between a rest position and an actuation position in which it is able to cooperate with the teeth of a thirty wheel 56 of the day of month mobile 50 to cause the latter to turn by at least one step on each actuation.

The day of the month mobile 50 carries a month actuation finger 58 arranged to drive a month reducer wheel set 60 once per complete turn of the mobile 50 on itself.

The month actuation finger 58 is mobile relative to the mobile 50 over a certain range as a safety measure during correction operations.

The month reducer wheel set 60 is interengaged with a month mobile 62 via a toothing having one hundred and forty-nine teeth so that the month mobile 62 advances by one step per Chinese month and turns on itself in one hundred and forty-nine Chinese months, i.e. twelve Chinese years when the current cycle includes one hundred and forty-nine Chinese months or twelve Chinese years and an additional Chinese month when the current cycle includes only 148 Chinese months.

Here the month mobile 62 carries the year hand 26 so that it advances by one step at the end of each Chinese month.

The month mobile 62 also carries a month cam 64 having one hundred and forty-nine peripheral sectors of substantially the same length and each of which is associated with a given Chinese month in the current duodecimal cycle and the mean radius of which is a function of the length of the corresponding Chinese month. Thus, in the case of the Chinese calendar the peripheral sectors can have only two different mean radii, a short radius associated with the Chinese months comprising twenty-nine days and a long radius associated with the Chinese months comprising thirty days.

The day of the month lever 54 includes a day of the month feeler-spindle 66 arranged to cooperate with the month cam 64 in such a manner as to define its rest position, among two possible rest positions, as a function of the length of the current month. It will be noted that in practice the short-radius sectors of the month cam 64 have a length slightly greater than that of the long-radius sectors to guarantee more precise cooperation with the day of the month feeler-spindle 66.

Figure 2:
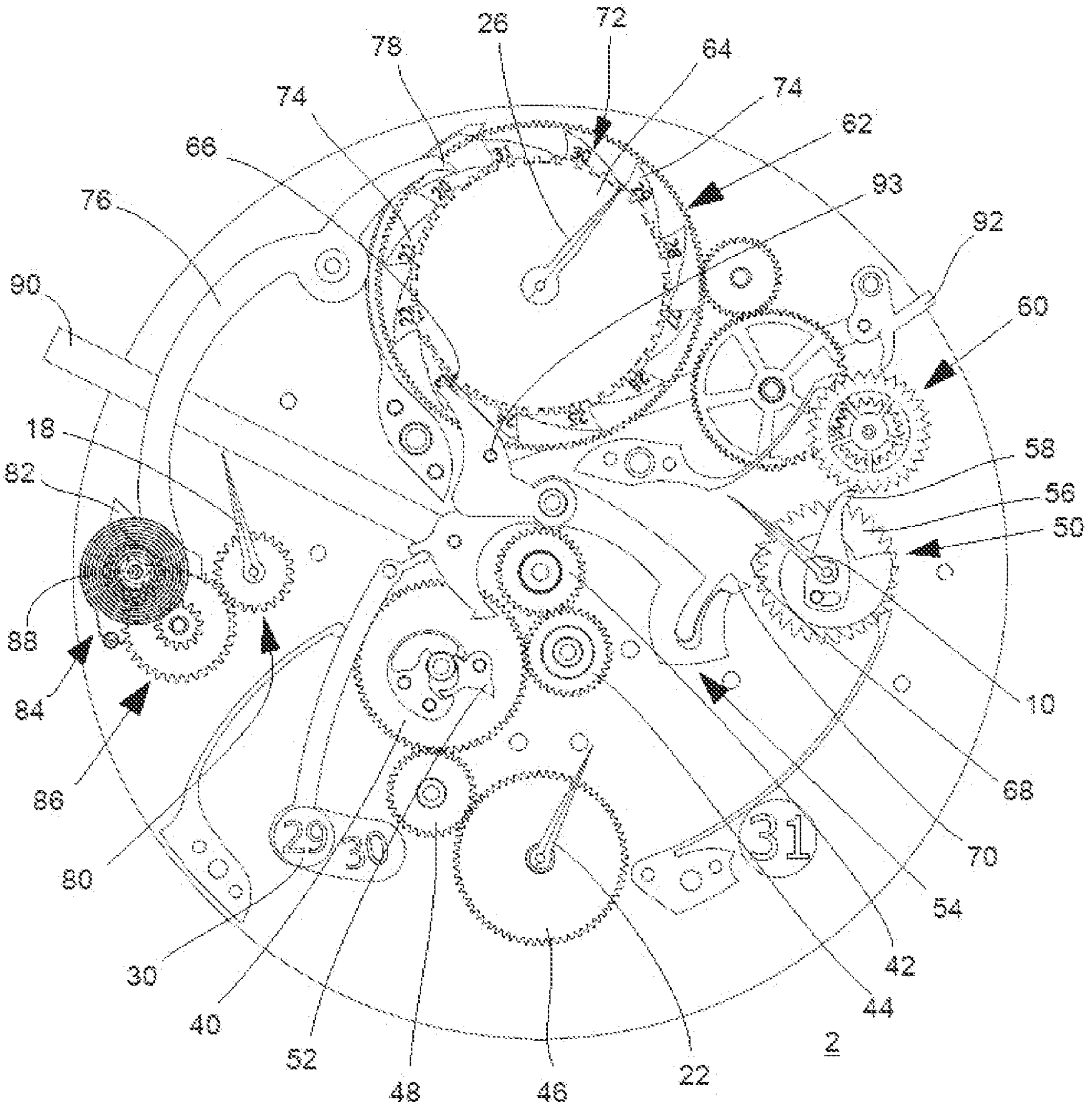
FIG. 2 represents a simplified front view of one embodiment of a display mechanism corresponding to the display depicted in FIG. 1.

In the configuration depicted in FIG. 2, the day of the month feeler-spindle 66 bears against a sector of the month cam 64 of mean short radius corresponding to a Chinese month including twenty-nine days. To move to its other rest position, associated with a month comprising thirty days, the day of the month lever 54 must pivot slightly in the anticlockwise direction as seen in FIG. 2.

Furthermore, of the thirty teeth of the thirty wheel 56 twenty-nine teeth are substantially the same length and a thirtieth tooth 68 is longer than the others and is intended to be positioned in reach of an actuation beak 70 of the day of the month lever 54 on the thirtieth day of months comprising thirty days.

The month cam 64, the day of the month lever 54 and the thirty wheel 56 are conformed and positioned relative to one another in such a manner that the actuation beak 70 of the day of the month lever 54 is able to act on the thirtieth tooth 68 as soon as the twenty-ninth day of the months comprising twenty-nine days to cause the day of the month mobile 50 to advance by two steps when said month lever 54 goes from its rest position to its actuation position. In fact, in the case of a Chinese month including twenty-nine days, the actuation beak 70 of the day of the month lever 54 is farther from the thirty wheel 56, in the rest position of the day of the month lever 54, and therefore has a longer travel when the latter is moved toward its actuation position than in the case of a Chinese month comprising thirty days. The indication of the Chinese day of the month is therefore able to go directly from the twenty-ninth of one month to the first of the next month.

Note that the actuation beak 70 is preferably retractable, so as to be able to go behind the longer tooth 68 during Chinese months comprising thirty days, after actuation of the thirty wheel 56 to go from the twenty-ninth to the thirtieth, the tooth 68 being thereafter in position to be driven during the next change of the day of the month.

The month mobile 62 also carries a year cam 72 indexed on the month cam 64 and including twelve branches 74 defining as many series of steps each of which is associated with a given Chinese year, each series of steps comprising a number of steps corresponding to the number of months of the associated Chinese year.

Thus, a branch 74 associated with a Chinese year not including an intercalary month carries a series of steps comprising twelve steps while a branch 74 associated with a Chinese year including an intercalary month carries a series of steps comprising thirteen steps.

The display mechanism 2 includes a rotary month lever 76 carrying a month feeler-spindle 78 held in contact with the year cam 72 to define the angular orientation of the month lever 76. The latter moreover has a kinematic connection to a month display mobile 80 carrying the month hand 18 to drive it in a retrograde movement.

To this end, here the month lever 76 carries a rack 82 interengaged with a retrograde mobile 84 itself interengaged with the month display mobile 80 via a demultiplier mobile 86. The retrograde mobile 84 includes a return spring 88 for moving the month hand 18 from the "12" indication to the "1" indication during changes of the Chinese year and to keep the month feeler-spindle 78 pressed against the periphery of the year cam 72.

In the case of the construction associated with the display depicted in FIG. 1, the kinematic connection between the month lever 76 and the month display mobile 80 is such that the month hand 18 travels an angle of substantially 330 degrees to go from the first month of a given year to the twelfth, before returning to the "1" indication by turning in the opposite direction.

Still in connection with this construction, and considering the month graduations 20, remember that three indicator positions are possible for each Chinese month: a central position to indicate a month that is not associated with an intercalary month and two additional positions, on respective opposite sides of the central position, for respectively displaying a month with which an intercalary month is associated and the corresponding intercalary month. To be more precise, in the situation depicted in FIG. 1, if it is considered that the passage from one standard month to another defines a step, the passage from a standard month to a month associated with an intercalary month is effected by means of a ¾ step movement, the passage to the intercalary month is then effected by a half-step movement, and the passage from the intercalary month to the next standard month is finally effected by another ¾ step movement, the total movement representing the equivalent of two complete steps.

This implies an adaptation of the geometry of the steps of the year cam 72 to enable correct display of the Chinese months. In this case, when a year includes an intercalary month, the steps respectively associated with the month preceding the intercalary month, the intercalary month and the month following the intercalary month each have a reduced height compared to the height of the other steps of the corresponding series of steps (here, respectively, ¾-½-¾ as explained hereinabove).

Of course, the values that have just been indicated are indicated by way of non-limiting illustrative examples only and the person skilled in the art will encounter no particular difficulty in adapting the present teaching as a function of their own requirements, without this departing from the scope of the invention as defined by the appended claims. Thus, the distribution of the dots 21 serving to display the intercalary months could be different, for example such that the month hand 18 moves ⅔ step to go from a given month to a month including an intercalary month, then again ⅔ step to go to the intercalary month and finally again ⅔ step to go to the month following the intercalary month. The corresponding steps on the year cam 72 will then have heights of ⅔-⅔-⅔ compared to the other steps.

In the case of the variant display of months referred to above, with alternating numbers of months and of dots, it is clear that the steps associated with an intercalary month and with the month directly following the intercalary month would each have a height equal to half the height of the other steps, so that the month hand 18 can execute half-steps to go from the month preceding the intercalary month (and therefore bearing the same number as the intercalary month) to the intercalary month and then to go from the intercalary month to the month following the intercalary month.

Thanks to this construction of the display mechanism 2, a correct and precise display is generally obtained (necessitating no correction on the part of the user) of the Chinese day of the month, the Chinese month and the Chinese year over a cycle of n years, n being a predefined number chosen by the manufacturer of the mechanism. Once the current cycle arrives at its end, it suffices to replace the month mobile 62, and possibly the dial 1 as a function of the nature of the information that it carries, to prepare the corresponding timepiece to display the indications in the next cycle. The timepiece manufacturer could advantageously cause the duration of the cycles displayed to coincide with the period between two revisions of the corresponding timepiece. Thus, the watchmaker responsible for carrying out the revision could profit from this occasion to update the month mobile 62 and the dial 1.

The display mechanism 2 depicted in FIG. 2 further includes a mobile for displaying the length of the months, serving directly as the month length display member 30, cooperating with the day of the month lever 54 so as to be able to occupy two different positions as a function of the length of the current month, to display the "29" indication in front of the aperture 32 during months of twenty nine days and to display the "30" indication during months of thirty days.

FIG. 2 further depicts a day of the month corrector 90 arranged to be able to cause the day of the month lever 54 to pivot and to increment the display of the day of the month in response to appropriate action of a user on an external control member (not visible). A month corrector 92 is also represented, the latter being arranged to cooperate with a wheel of the month reducer wheel set 60 to enable correction of the angular orientation of the month mobile 62. The month corrector 92 is advantageously arranged simultaneously to raise the day of the month lever 54 and to move its day of the month feeler-spindle 66 away from the month cam 64 by means of a pin 93.

Finally, the display mechanism 2 includes various conventional positioning springs, in particular jumpers, which are not described in detail because their function is evident in FIG. 2.

Figure 3:
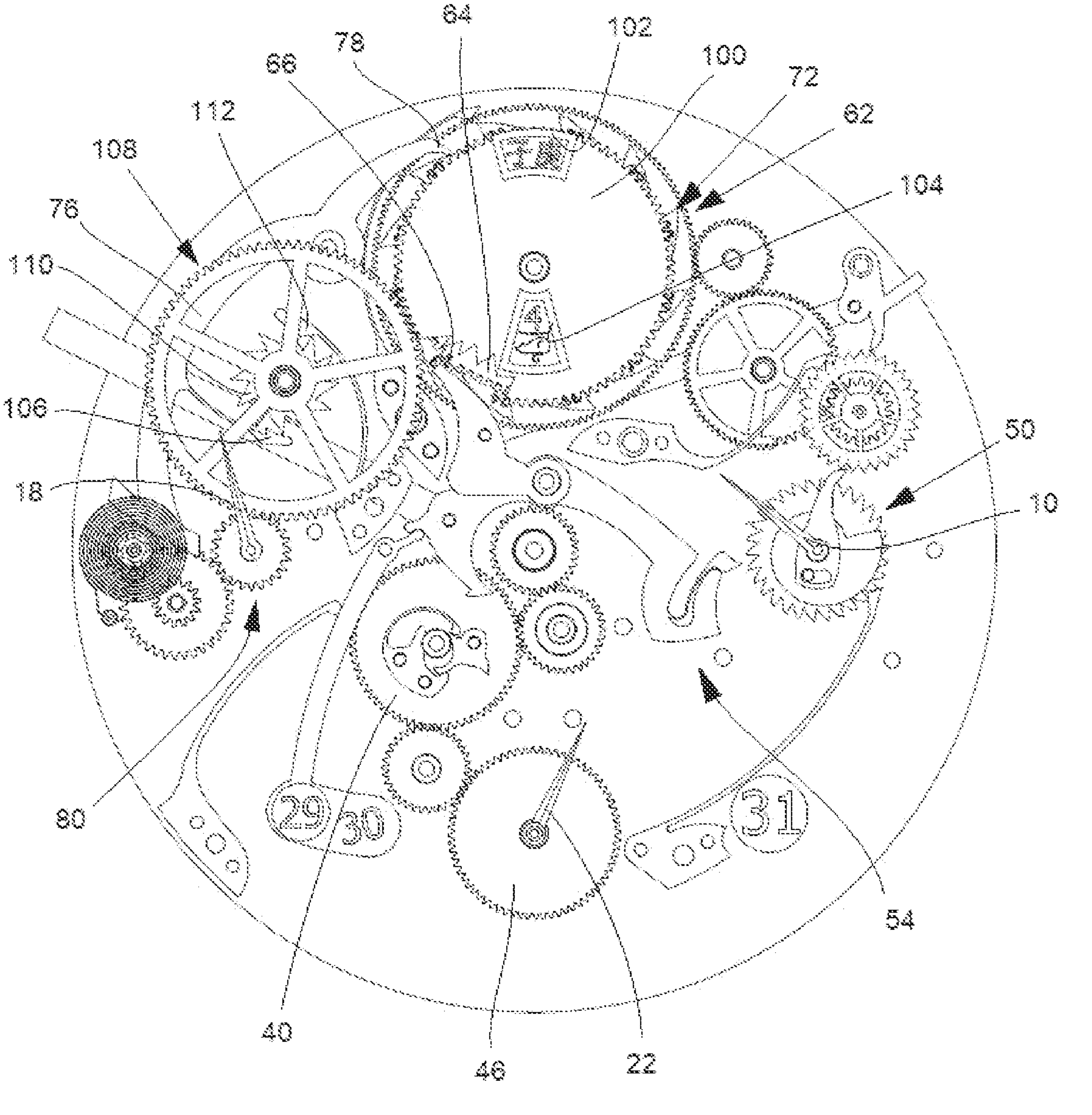
FIG. 3 represents a simplified front view of a first variant embodiment of the display mechanism depicted in FIG. 2.

FIG. 3 represents a simplified front view of a first variant embodiment of the display mechanism 2 depicted in FIG. 2.

To simplify understanding of this view, the same components as in the FIG. 2 construction bear the same reference numbers.

In accordance with this variant embodiment, the year hand 26 is replaced by a year disc 100 bearing indications relating to the Chinese years (which were carried by the counter 28 in the FIG. 1 display). One or more apertures 102, 104 in the corresponding dial (not visible) may be provided to display the pertinent information at a given time.

In this case, the month lever 76 includes a beak 106 arranged to cooperate with a year driving mobile 108 and to cause it to pivot by one step at year end when the month feeler-spindle 78 goes from one series of steps of the year cam 72 to the next, the year driving mobile 108 being intended to drive the year disc 100. In fact, when the month lever 76 pivots in the anticlockwise direction during the year, the beak 106 is moved upstream of a tooth of a driving wheel 110 of the year driving mobile 108, so as to be able to exert traction on that tooth when the month lever 76 drops at the time of the change of year to cause the year driving mobile 108 to pivot by one step. A jumper 112 cooperates with the teeth of the driving wheel 110 to maintain the angular position of the year driving mobile 108 in the conventional manner.

Figure 4:
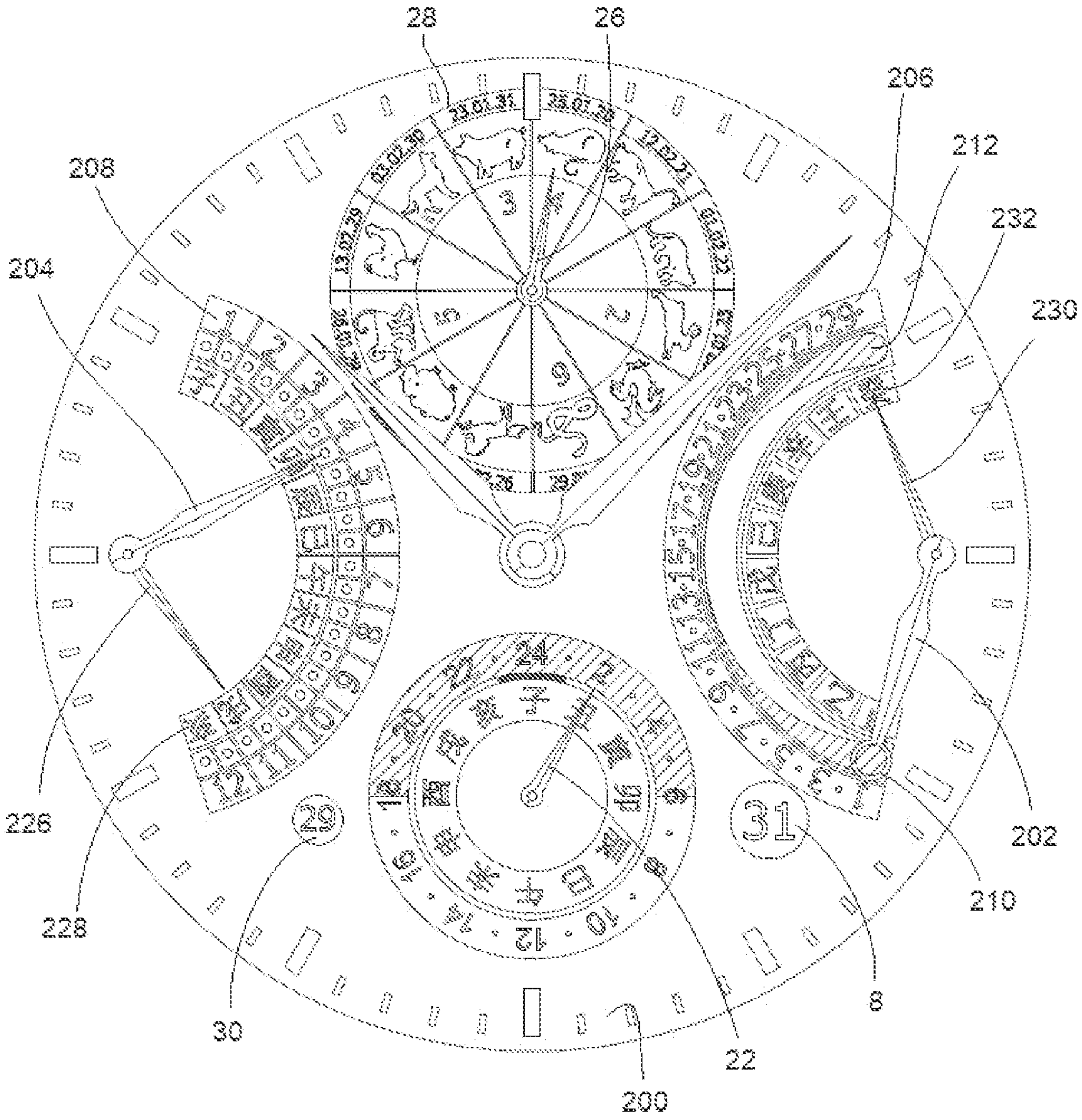
FIG. 4 represents a simplified front view of a timepiece dial associated with a display mechanism in accordance with a second variant embodiment of the display mechanism from FIG. 2.
Figure 5:
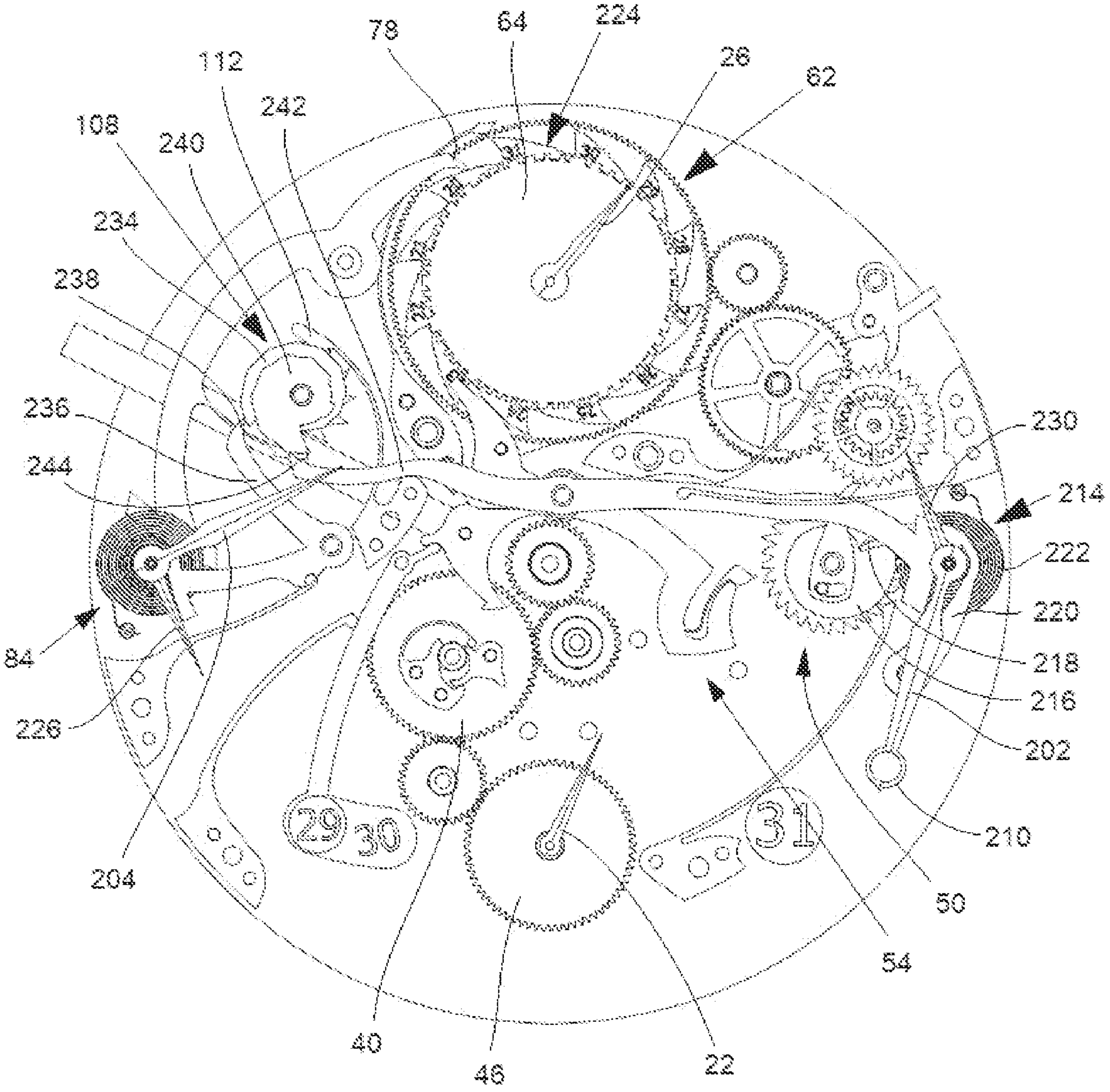
FIG. 5 represents a simplified front view of the display mechanism in accordance with the second variant embodiment.

FIGS. 4 and 5 respectively represent simplified front views of a display with a dial 200 and the corresponding display mechanism in accordance with a second variant of the version depicted in FIGS. 1 and 2.

By way of non-limiting illustration, here the day of the month and month displays are implemented by hands 202 and 204 moving in front of respective graduations 206 and 208 both extending over a circular arc of the order of 150 degrees.

The day of the month hand 202 has an aperture 210, in the vicinity of its free end, intended to cooperate with a phases of the moon display strip 212 carried by the dial 200. The strip 212 has a light-colored central region surrounded on respective opposite sides by two dark regions, the distribution between the light region and the dark regions being such that a representation of the state of the moon appears at all times in the aperture 210. Thus, in particular, the interior of the aperture 210 appears completely dark at the month start and end to represent the new moon, while it appears entirely light in color on the fifteenth of the month to represent the full moon. Thanks to these features, the day of the month hand 202 enables simultaneous display of two kinds of information, the day of the month and the phases of the moon, in a manner that is both simple and relatively compact, without this impeding readability.

For ensuring a retrograde driving of the month hand 202 the display mechanism includes a day of the month display mobile 214 driven in rotation, with retrograde return, from the day of the month mobile 50. To this end, the latter carries a day of the month display cam 216 in the shape of a spiral with which cooperates a day of the month display feeler-spindle 218 carried by a day of the month display lever 220. The latter also carries teeth interengaged with a pinion (not visible) of the day of the month display mobile 214, so as to cause the latter to turn as the day of the month display feeler-spindle 218 tracks the curve of the day of the month display cam 216. A spiral spring 222 cooperates with the pinion of the day of the month display mobile 214 to return the day of the month hand 202 to its initial position during changes of month, and to maintain the day of the month display feeler-spindle 218 pressed against the periphery of the day of the month display cam 216.

Where driving the month hand 204 is concerned, it is seen that here it can be carried directly by the retrograde mobile 84, a reducer mobile no longer being necessary because the angle to travel is smaller compared to the FIG. 1 version.

Furthermore, it is seen that the distribution of the month graduations 208 is similar to that of the month graduations 20 of the FIG. 1 version, except that their angular extent is different. In fact, in the FIG. 4 version, as described above with reference to FIG. 1, the passage from a standard month to a month which is associated with an intercalary month is effected by a ¾ step movement, the movement to the intercalary month is then effected by a one half-step movement, and the passage from the intercalary month to the next standard month is finally effected by another ¾ step movement.

Here again, the steps of the year cam 224 respectively associated with the month preceding the intercalary month, the intercalary month and the month following the intercalary month have a reduced height compared to the height of the other steps of the corresponding series of steps (here, respectively, ¾-½-¾ as explained hereinabove, although other values could be used such as ⅔-⅔-⅔ for example).

In addition to the description already given with reference to FIG. 1, the display depicted in FIG. 4 enables indication of two supplementary items of information, namely the terrestrial branches by means of a terrestrial branch hand 226, driven according to a retrograde movement in front of appropriate graduations 228, and the celestial stems by means of a celestial stem hand 230, driven according to a retrograde movement in front of appropriate graduations 232.

For driving the hands 226 and 230, the display mechanism includes a year driving mobile 108 as described above with reference to FIG. 3. In this case, the year driving mobile 108 is not necessarily arranged to drive a year disc 100 as depicted in FIG. 5. This mobile 108 includes a terrestrial branch cam 234 in the shape of a spiral having twelve sections over one complete turn, the display mechanism including a terrestrial branch lever 236 having a terrestrial branch feeler-spindle 238, arranged to cooperate with the terrestrial branch cam 234, and kinematically connected to a terrestrial branch display mobile intended to control the movement of the terrestrial branch hand 226. The terrestrial branch display mobile is not directly visible in FIG. 5 because it is coaxial with the day of the month display mobile 214.

In a similar manner, the mobile 108 includes a celestial stem cam 240 in the shape of a spiral and including twelve sections (ten plus two as explained above) over one complete turn, the display mechanism including a celestial stem lever 242 including a celestial stem feeler-spindle 244, arranged to cooperate with the celestial stem cam 240, and kinematically connected to a celestial stem display mobile intended to control the movement of the celestial stem hand 230. The celestial stem display mobile is not directly visible in FIG. 5 either, because it is coaxial with the retrograde mobile 84.

It is therefore seen that if the terrestrial branch cycle recommences every twelve Chinese years, that of the celestial stem recommences every ten years, thus resulting in the sexagesimal global cycle of the Chinese calendar, that is to say a period of sixty (Chinese) years.

It will be noted that thanks to the two additional sections provided on the celestial stem cam 240, beyond the cycle of ten years, the corresponding display remains correct over a complete cycle of twelve years, i.e. the cycle of validity of the month mobile 62. Thus when the timepiece is handed over to a watchmaker for its revision and replacement of the month cam 62 and the dial 1, the watchmaker is able at the same time to replace the celestial stem cam 240 by a new version on which the two additional sections are offset by two years relative to the preceding cam, so that the new cam is valid for the next twelve Chinese years.

Of course, the calendar mechanism could alternatively include a celestial stem cam having ten sections and driven to complete one turn on itself in ten years, without departing from the scope of the invention as defined in the appended claims.

Figure 6:
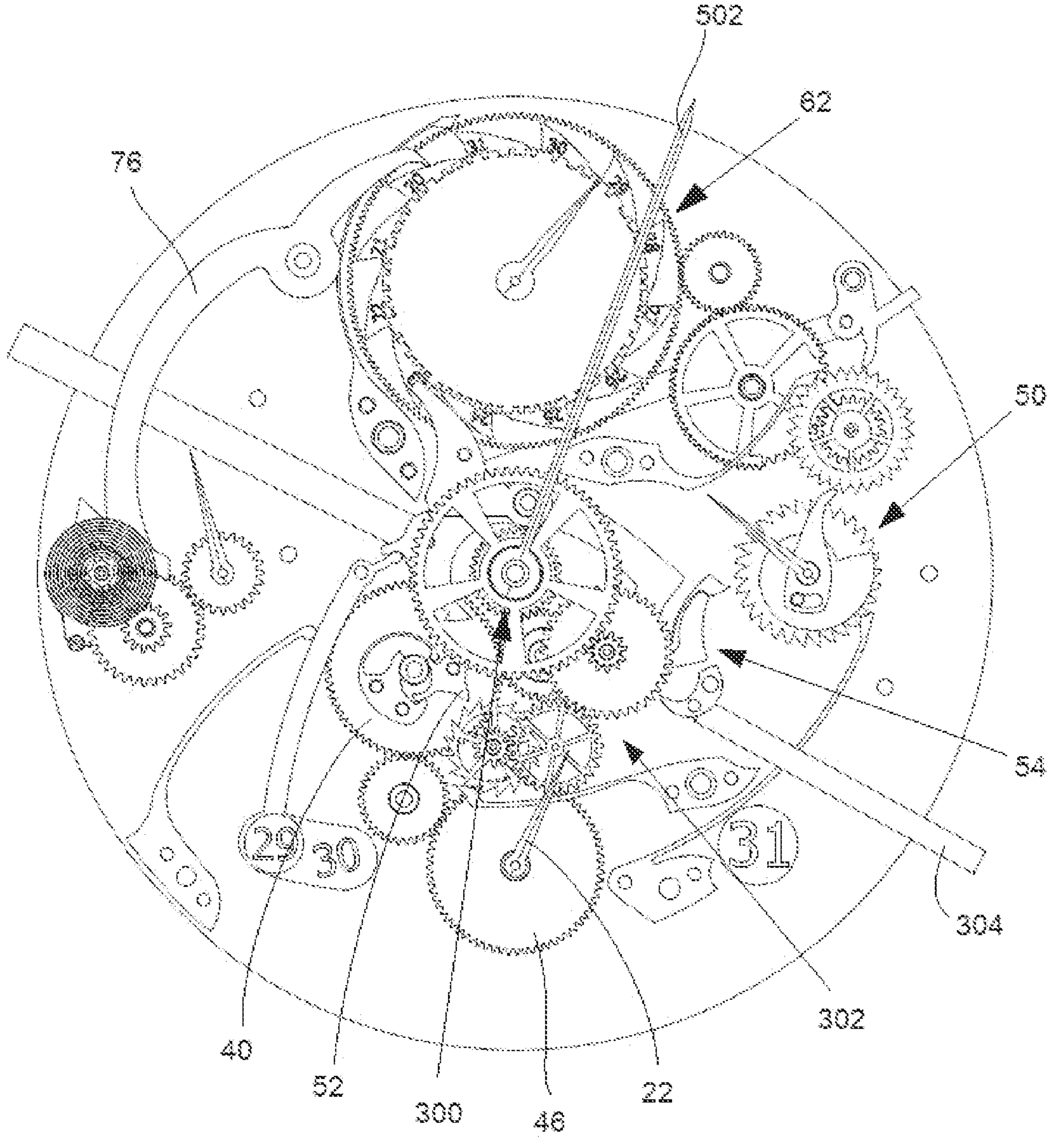
FIG. 6 represents a simplified front view of a third variant embodiment of the display mechanism depicted in FIG. 2.

FIG. 6 represents a simplified front view of a third variant embodiment of the display mechanism depicted in FIG. 2.

Here, the actuation finger 52 of the twenty-four hour wheel 40 is arranged to control the daily movement of an annual display mobile 300 intended to control the movement of an annual display member, for example a central hand 502, via a reducer wheel set 302, so that the annual display member effects one jump each day and a complete turn on itself in one year.

This annual display member can in particular play the role of a simple display member of the Gregorian day of the month relative to appropriate graduations that may be placed at the periphery of the dial, instead of or in addition to the display 8. In this case, a corrector 304 may be used for stepwise correction of the position of the annual display member in response to appropriate action by a user, the corrector actuating a mobile of the reducer wheel set 302.

Figure 7:
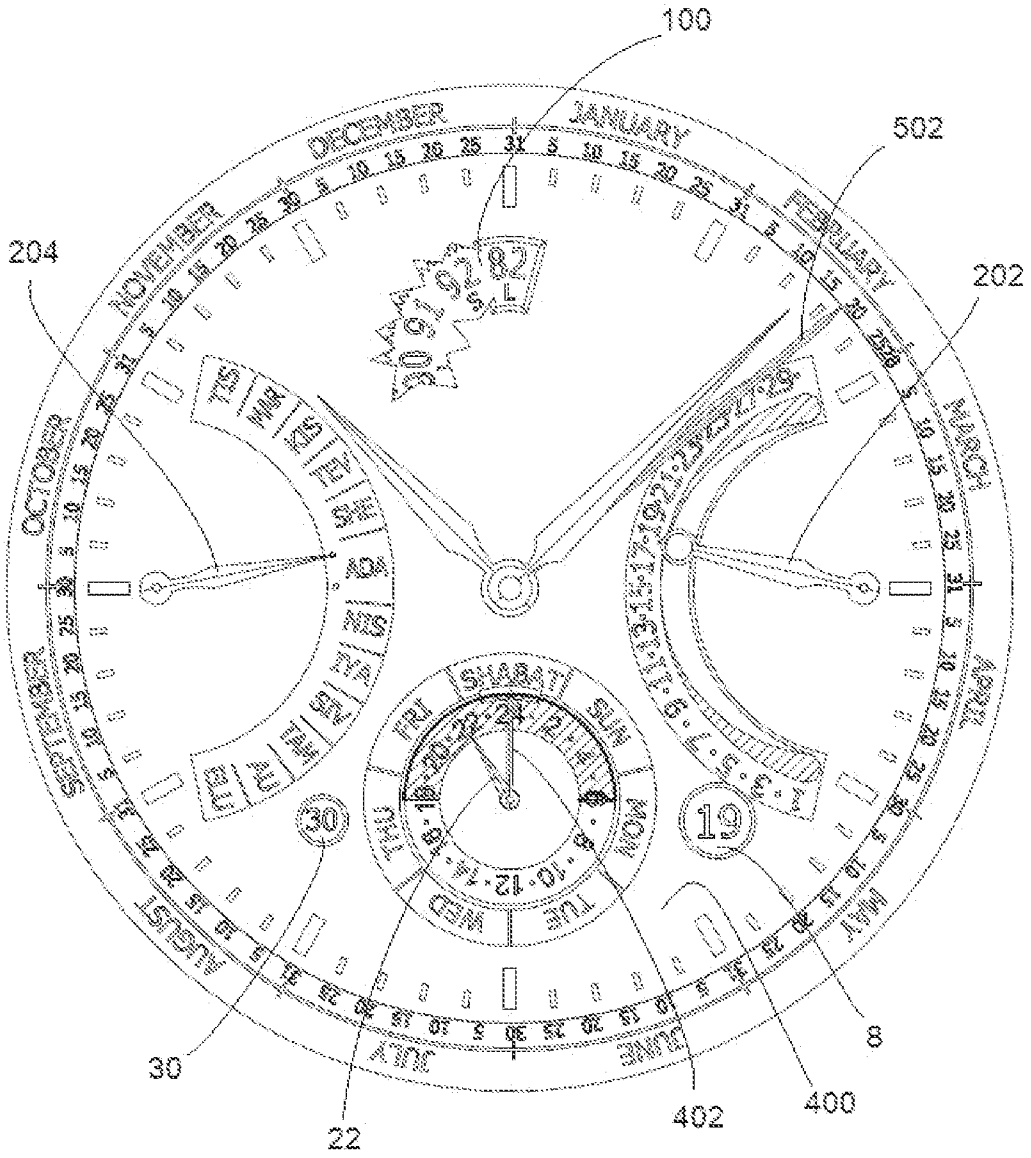
FIG. 7 represents a simplified front view of a timepiece dial depicting the use of a display mechanism in accordance with a second preferred embodiment of the present invention.

FIG. 7 represents a simplified front view of a timepiece dial 400 depicting the implementation of the display mechanism in accordance with a second preferred embodiment of the present invention, more precisely to enable the display of indications relating to the Hebrew calendar.

The Hebrew calendar is also of the lunisolar type and includes common years comprising twelve months and embolismic years comprising thirteen months, distributed in accordance with the metonic cycle of nineteen years. Thus, over the metonic cycle of nineteen years, seven years are embolismic, i.e. the $3^{rd}$, $6^{th}$, $8^{th}$, $11^{th}$, $14^{th}$, $17^{th}$ and $19^{th}$ years, the additional month systematically including twenty-nine days and being always intercalated at the same moment in an embolismic year. Thus, the month “Adar” is divided into “Adar I” and “Adar II” (or “Veadar”) during embolismic years.

On the basis of these explanations, it is clear that the display mechanism in accordance with the invention, as described above, may easily be adapted to enable precise and reliable display of information relating to the Hebrew calendar.

In the case of the variant depicted in FIG. 7, it is necessary to produce the year cam in such a manner that the series of steps associated with embolismic years comprise thirteen steps instead of twelve as for the common years, the height of the steps associated with the embolismic years then being adapted so as to be similar to what has been described with reference to FIGS. 4 and 5 (here ⅔ for Adar I, ⅔ for Adar II and ⅔ for Nissan).

Of course, it is possible for the year cam to include a number of series of steps less than nineteen without departing from the scope of the invention, which then necessitates a change of the month mobile at each end of the corresponding cycle, advantageously keyed to the periods of revision of the corresponding timepiece.

FIG. 7 also shows by way of non-limiting example that the twenty-four hour wheel 40 can be used to drive a days of the week display member 402.

Figure 8:
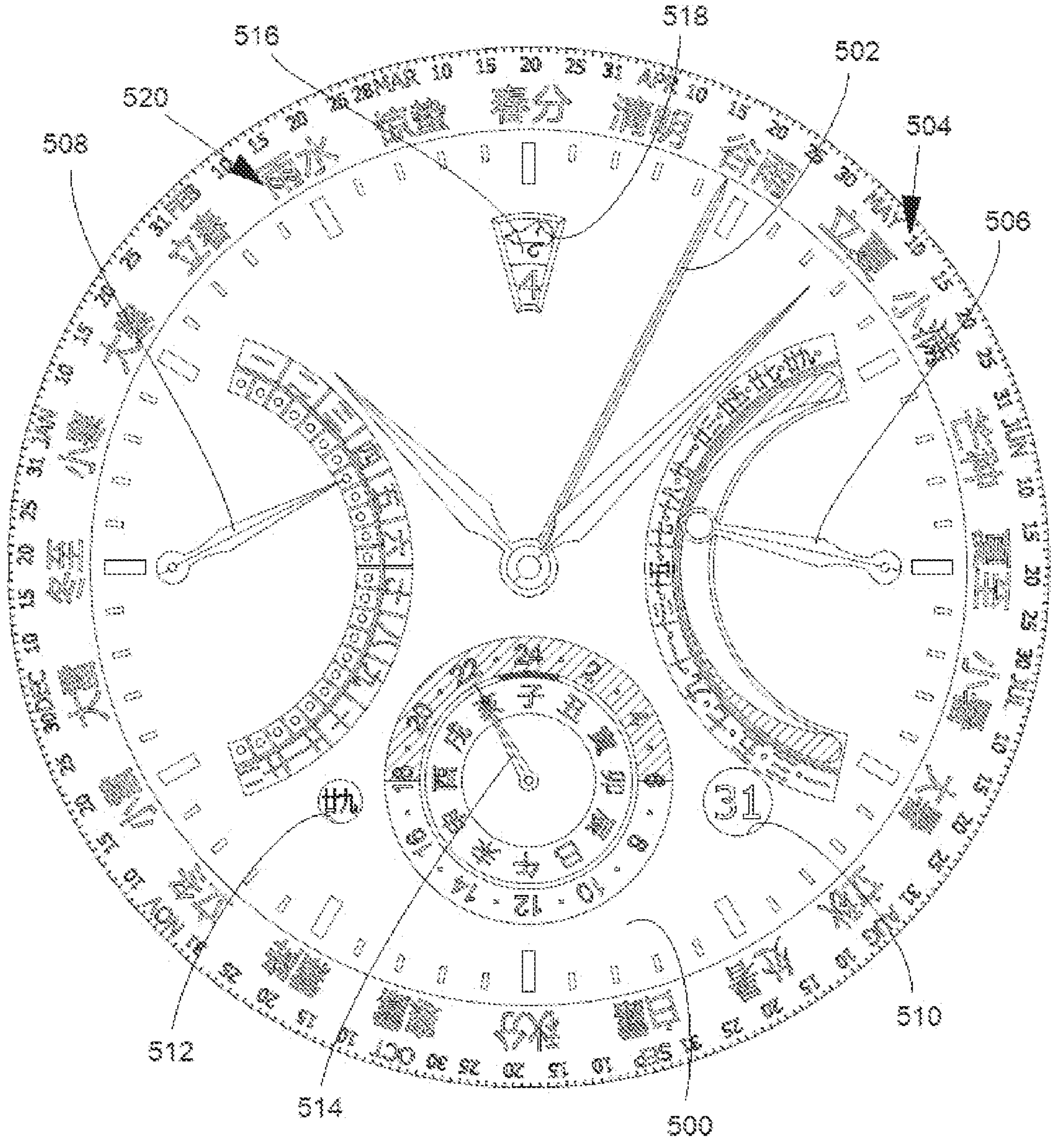
FIG. 8 represents a simplified front view of a timepiece dial in accordance with an additional variant embodiment.

FIG. 8 represents a simplified front view of a timepiece dial 500 in accordance with a further variant embodiment.

Here, the dial 500 enables central display of the Gregorian day of the month by means of a central hand 502 pointing to Gregorian day of the month graduations 504 and completing one complete turn in a solar year (approximately 365.25 days) thanks to an appropriate driving mechanism one embodiment of which is described above.

Moreover, on top of current time, the dial 500 is also intended to display the Chinese day of the month and the phases of the moon by means of the day of the month hand 506, the month-including embolismic months—by means of the month hand 508, the Gregorian day of the month in a first aperture 510, the number of days of the current month in a second aperture 512, and the hour over twenty-four hours as well as the Chinese double hours by means of a twenty-four hand 514. A year disc 516 visible in an aperture 518 also enables display of the Chinese zodiac signs and the number of the intercalary month, when there is one, for the current Chinese year.

As well as the Gregorian calendar and a lunisolar calendar, a solar zodiac calendar termed an agricultural calendar is used in a manner that is traditional in certain Asiatic cultures. In Chinese culture this agricultural calendar is based on Jie Qi, of which there are twenty-four regularly distributed across a solar year. These Jie Qi and their applications are not described in more detail here because this has no impact on the execution of the invention.

The fact that these Jie Qi are keyed to the Sun cycle enables display thereof on a scale parallel to that of the Gregorian calendar, as depicted in FIG. 8, on which a Jie Qi scale 520 is represented, concentric with the Gregorian day of the month graduations 504.

The period associated with the first Jie Qi of the year starts the day of the spring equinox, i.e. 21 March. Also, the symbol of the first Jie Qi is positioned at noon to enable intuitive reading whereas the graduations of the Gregorian calendar 504 are oriented in an unusual manner because it is 21 March that is positioned at noon, so as to be arranged facing the first Jie Qi. Thanks to this particular arrangement, it is remarkably easy to read the correspondence between the Jie Qi and the dates of the Gregorian calendar.

Of course, without departing from the scope of the invention as defined by the appended claims, it is also possible to place 1st January of the Gregorian year at noon rather than 21 March, which is more conventional for an occidental user, and to orient the Jie Qi in an appropriate manner.

Furthermore, displaying other information linked to the solar cycle at the periphery of the dial can also be envisaged, such as for example the signs of the zodiac (the occidental zodiac, the signs of the Chinese zodiac being already displayed on the year disc 516).

Thanks to the features that have just been described, a mechanism is obtained for displaying information relating to a precise and reliable calendar that can easily be adapted to the type of calendar concerned, including complex lunisolar calendars such as the Chinese calendar, without the user having to intervene to correct it at least during an entire cycle of n years, n being defined by the manufacturer as a function of their own requirements and constraints. The display mechanism according to the invention can therefore be easily adapted for the display of information relating to the Hijri, Korean or Hindu calendars, for example.

The implementation of the present invention is not limited by the nature of the information displayed, such as that shown and described, or by the manner in which it is displayed. In fact, the person skilled in the art will encounter no particular difficulty in adapting the present teaching to the implementation of a display mechanism as defined by the appended claims as a function of their own requirements, for example by at least partly combining with one another the various variants described, where that is possible. For example, replacing the display of the Gregorian day of the month in an aperture by display by a hand (possibly but not necessarily retrograde) may in particular be envisaged. Accordingly, a hand of this kind could be arranged at various locations on the dial as a function of the requirements and constraints of the person skilled in the art, for example in the counter located at six o'clock, concentrically with the twenty-four hour display and/or Chinese double hour display described (possibly as an alternative to or additionally to the display of the days of the week as described with reference to FIG. 7).

The invention claimed is:

1. A calendar display mechanism for a timepiece movement, including a day of the month mobile intended to control the movement of a day of the month display member and to be able to complete a full turn on itself in a maximum number p of days during long months, a mechanism for actuation of said day of the month mobile arranged to cause said day of the month mobile to turn by at least one step each day, a month mobile arranged to be actuated by said day of the month mobile on each full turn of said day of the month mobile, a correction device for short months including a month cam carried by said month mobile and including a plurality of peripheral sectors each of which is associated with a given month in a cycle of n years, n being greater than one, the mean radius of each of said peripheral sectors being a function of the length of the associated month, said mechanism for actuation of said day of the month mobile being arranged to interact with said month cam and to allow actuation of said day of the month mobile by at least one additional step at the end of each short month comprising a number of days less than p, wherein said month mobile carries a year cam indexed on said month cam and including n series of steps each of which is associated with a given year, each series of steps comprising a number m of steps corresponding to the number of months in the associated year, and wherein the calendar display mechanism includes a rotary month lever carrying a month feeler-spindle held in contact with said year cam to define the angular orientation of said rotary month lever, said rotary month lever also having a kinematic connection with a month display mobile to drive it according to a retrograde movement.

2. The calendar display mechanism of claim 1, wherein said rotary month lever and said month display mobile are shaped and kinematically connected to one another in such a manner that said month display mobile pivots from an initial orientation to a final orientation separated from one another by an angle comprised between 40 and 360 degrees to display the months throughout a given year, and wherein the calendar display mechanism includes an elastic return member arranged to act on said rotary month lever to hold said month feeler-spindle against said year cam and to move said month display mobile from its final orientation to its initial orientation at year end.

3. The calendar display mechanism of claim 2, wherein said day of the month mobile includes a day of the month cam in the shape of a spiral, the calendar display mechanism including a day of the month display lever having a day of the month feeler-spindle, arranged to cooperate with said day of the month cam, and a kinematic connection to a day of the month display mobile intended to carry the day of the month display member.

4. The calendar display mechanism of claim 3, wherein at least one of said n series of steps of said year cam comprises a number m of steps different from twelve.

5. The calendar display mechanism of claim 3, wherein it is intended to display the Chinese calendar over twelve years, wherein said month mobile includes a driving wheel intended to be driven once a month from said day of the month mobile and having one hundred and forty-nine teeth, wherein said month cam has one hundred and forty-nine peripheral sectors, and wherein said year cam includes twelve series of steps for a total of one hundred and forty-nine steps.

6. The calendar display mechanism of claim 1, wherein said day of the month mobile includes a day of the month cam in the shape of a spiral, the calendar display mechanism including a day of the month display lever having a day of the month feeler-spindle, arranged to cooperate with said day of the month cam, and a kinematic connection to a day of the month display mobile intended to carry the day of the month display member.

7. The calendar display mechanism of claim 1, wherein at least one of said n series of steps of said year cam comprises a number m of steps different from twelve.

8. The calendar display mechanism of claim 7, when at least one of said n years includes at least one intercalary month in addition to the twelve basic months, wherein, in said corresponding series of steps, at least two steps have a reduced height compared to that of the other steps.

9. The calendar display mechanism of claim 8, wherein, in each of said series of steps corresponding to said at least one of said n years including at least one intercalary month, the steps respectively associated with the month preceding the intercalary month, the intercalary month and the month following the intercalary month each have a reduced height compared to the height of the other steps of the corresponding series of steps.

10. The calendar display mechanism of claim 1, wherein said month mobile includes a shaft intended to carry a member for displaying information relating to the current year in association with at least one fixed indication.

11. The calendar display mechanism of claim 1, wherein said rotary month lever includes a beak arranged to cooperate with a year driving mobile, and to cause said year driving mobile to pivot by one step at year end when said month feeler-spindle moves from one series of steps to the next, said year driving mobile being intended to drive at least one member for displaying information relating to the current year in association with at least one fixed marker.

12. The calendar display mechanism of claim 11, wherein at least one of said n series of steps of said year cam comprises a number m of steps different from twelve so that said calendar display mechanism is adapted to display the Chinese calendar, and wherein said year driving mobile includes a terrestrial branch cam in the shape of a spiral and having twelve sections over a complete turn, the calendar display mechanism including a terrestrial branch lever having a terrestrial branch feeler-spindle, arranged to cooperate with said terrestrial branch cam, and kinematically connected to a terrestrial branch display mobile intended to control the movement of a terrestrial branch display member.

13. The calendar display mechanism of claim 11, wherein at least one of said n series of steps of said year cam comprises a number m of steps different from twelve so that said calendar display mechanism is adapted to display the Chinese calendar, and wherein said year driving mobile includes a celestial stem cam in the shape of a spiral and having twelve sections over a complete turn, in the form of ten different sections two of which are duplicated to constitute two additional sections, the calendar display mechanism including a celestial stem lever having a celestial stem feeler-spindle, arranged to cooperate with said celestial stem cam, and kinematically connected to a celestial stem display mobile intended to control the movement of a celestial stem display member.

14. The calendar display mechanism of claim 1, wherein it is adapted to display a lunar or lunisolar calendar in which the months comprise twenty-nine or thirty days, wherein said mechanism for actuation of said day of the month mobile includes a day of the month lever intended to be actuated once a day to pivot from a rest position to an actuation position in which it acts, via an actuation beak that it carries, on a thirty wheel of said day of the month mobile to cause said day of the month mobile to advance by at least one step, wherein said day of the month lever includes a day of the month feeler-spindle arranged to cooperate with said month cam to define its rest position among two possible rest positions as a function of the length of the current month, wherein said thirty wheel has twenty-nine teeth of substantially the same length and a thirtieth tooth longer than said twenty-nine teeth and intended to be positioned in reach of said actuation beak the thirtieth day of months comprising thirty days, and wherein said month cam, said day of the month lever and said thirty wheel are shaped and positioned relative to one another in such a manner that said actuation beak is able to act on said thirtieth tooth as soon as the twenty-ninth day of months comprising twenty-nine days, to cause said day of the month mobile to advance by two steps when said day of the month lever goes from its rest position to its actuation position.

15. The calendar display mechanism of claim 14, further including a mobile for displaying the length of the month intended to control the position of a display member for displaying the length of the month, and cooperating with said day of the month lever in such a manner as to be able to occupy two different positions as a function of the length of the current month.

16. The calendar display mechanism of claim 1, further including a twenty-four hour wheel having a kinematic connection with an annual display mobile intended to control the movement of an annual display member in such a manner that said annual display member performs a complete turn on itself in one year.

17. The calendar display mechanism of claim 1, wherein it is intended to display the Chinese calendar over twelve years, wherein said month mobile includes a driving wheel intended to be driven once a month from said day of the month mobile and having one hundred and forty-nine teeth, wherein said month cam has one hundred and forty-nine peripheral sectors, and wherein said year cam includes twelve series of steps for a total of one hundred and forty-nine steps.

18. A timepiece movement comprising a calendar display mechanism including a day of the month mobile intended to control the movement of a day of the month display member and to be able to complete a full turn on itself in a maximum number p of days during long months, a mechanism for actuation of said day of the month mobile arranged to cause said day of the month mobile to turn by at least one step each day, a month mobile arranged to be actuated by said day of the month mobile on each full turn of said day of the month mobile, a correction device for short months including a month cam carried by said month mobile and including a plurality of peripheral sectors each of which is associated with a given month in a cycle of n years, n being greater than one, the mean radius of each of said peripheral sectors being a function of the length of the associated month, said mechanism for actuation of said day of the month mobile being arranged to interact with said month cam and to allow actuation of said day of the month mobile by at least one additional step at the end of each short month comprising a number of days less than p, wherein said month mobile carries a year cam indexed on said month cam and including n series of steps each of which is associated with a given year, each series of steps comprising a number m of steps corresponding to the number of months in the associated year, and wherein the calendar display mechanism includes a rotary month lever carrying a month feeler-spindle held in contact with said year cam to define the angular orientation of said rotary month lever, said rotary month lever also having a kinematic connection with a month display mobile to drive it according to a retrograde movement.

19. The timepiece movement of claim 18, wherein said rotary month lever and said month display mobile are shaped and kinematically connected to one another in such a manner that said month display mobile pivots from an initial orientation to a final orientation separated from one another by an angle comprised between 40 and 360 degrees to display the months throughout a given year, and wherein the calendar display mechanism includes an elastic return member arranged to act on said rotary month lever to hold said month feeler-spindle against said year cam and to move said month display mobile from its final orientation to its initial orientation at year end.

20. The timepiece movement of claim 19, wherein said day of the month mobile includes a day of the month cam in the shape of a spiral, the calendar display mechanism including a day of the month display lever having a day of the month feeler-spindle, arranged to cooperate with said day of the month cam, and a kinematic connection to a day of the month display mobile intended to carry the day of the month display member.

21. A timepiece having a timepiece movement comprising a calendar display mechanism including a day of the month mobile intended to control the movement of a day of the month display member and to be able to complete a full turn on itself in a maximum number p of days during long months, a mechanism for actuation of said day of the month mobile arranged to cause said day of the month mobile to turn by at least one step each day, a month mobile arranged to be actuated by said day of the month mobile on each full turn of said day of the month mobile, a correction device for short months including a month cam carried by said month mobile and including a plurality of peripheral sectors each of which is associated with a given month in a cycle of n years, n being greater than one, the mean radius of each of said peripheral sectors being a function of the length of the associated month, said mechanism for actuation of said day of the month mobile being arranged to interact with said month cam and to allow actuation of said day of the month mobile by at least one additional step at the end of each short month comprising a number of days less than p, wherein said month mobile carries a year cam indexed on said month cam and including n series of steps each of which is associated with a given year, each series of steps comprising a number m of steps corresponding to the number of months in the associated year, and wherein the calendar display mechanism includes a rotary month lever carrying a month feeler-spindle held in contact with said year cam to define the angular orientation of said rotary month lever, said rotary month lever also having a kinematic connection with a month display mobile to drive it according to a retrograde movement.

22. The timepiece according to claim 21, in which at least one of said n series of steps of said year cam comprises a number m of steps different from twelve and, in which at least two steps of said at least one of said n series of steps comprising a number m of steps different from twelve have a reduced height compared to that of the other steps, wherein the timepiece further includes a month display member arranged to be moved in front of month graduations having three possible indicator positions located in a display sector of predefined length for each month, a central position for displaying a month with which no intercalary month is associated and two additional positions on respective opposite sides of said central position for respectively displaying a month with which an intercalary month is associated and the corresponding intercalary month.

* * * * *